United States Patent [19]

Reese et al.

[11] 3,922,323

[45] Nov. 25, 1975

[54] CYCLIC PHOSPHONIC ACID ESTERS

[75] Inventors: Johannes Reese, Wiesbaden-Biebrich; Kurt Kraft, Wiesbaden-Dotzheim; Edgar Dick, Walsdorf near Idstein, all of Germany

[73] Assignee: Hoechst Aktiengesellschaft, Frankfurt am Main, Germany

[22] Filed: June 28, 1973

[21] Appl. No.: 374,534

Related U.S. Application Data

[63] Continuation of Ser. No. 57,758, July 23, 1970, abandoned, which is a continuation-in-part of Ser. No. 610,462, Jan. 20, 1967, abandoned.

[30] Foreign Application Priority Data
Jan. 22, 1966  Germany ............................ 3800212
Feb. 5, 1966  Germany ............................ 3813012
Feb. 12, 1966  Germany ............................ 3820339

[52] U.S. Cl. ..... 260/927 R; 260/45.7 P; 260/45.8 N; 260/45.8 NZ; 260/248 CS; 260/251 Q; 260/307 D

[51] Int. Cl.$^2$ ........................................... C07F 9/40
[58] Field of Search ..................... 260/927 R, 969

[56] References Cited
UNITED STATES PATENTS
3,511,857  5/1970  Baranauckas et al. ...... 260/927 R X
3,515,776  6/1970  Baranauckas et al. .......... 260/927 R FOREIGN PATENTS OR APPLICATIONS
553,997  3/1958  Canada .......................... 260/927 R

*Primary Examiner*—Richard L. Raymond
*Attorney, Agent, or Firm*—Berman, Aisenberg & Platt

[57] ABSTRACT

A flame-retardant composition consisting essentially of a) an unsaturated polymeric condensation product of unsaturated dibasic acid and polyhydric alcohol and b) a cyclic phosphonic ester having the formula (I) according to claim 1, wherein the symbols have the meaning as defined therein, a hardened body obtained from the composition, compounds of the formula (I) and a process for their preparation.

15 Claims, No Drawings

CYCLIC PHOSPHONIC ACID ESTERS

RELATED APPLICATIONS

The present application is a continuation of application Ser. No. 57,758, filed July 23, 1970, which in turn, is a continuation-in-part of application Ser. No. 610,462, filed Jan. 20, 1967. Both the parent and grandparent applications are now abandoned.

BACKGROUND

In the application of polyesters, especially unsaturated polyesters, and in the manufacture of products from compositions comprising unsaturated polyesters and copolymerisable monomers, it is often desired to render the polyesters and said products flame-resistant. This may be achieved, for example, by an admixture of compounds containing halogen and/or halogen and phosphorus. Thus, e.g., tris-(2,3-dibromopropyl)-phosphate may be admixed with hardenable compositions comprising styrene and unsaturated polyesters to render the shaped bodies obtained therefrom flame-resistant. Admixing, however, of such compounds which cannot be chemically bound into the molecule of the polyester has the disadvantage that exudation may take place from the hardened bodies, especially under strong temperature strain. Furthermore, the admixture of such substances is possible only within narrow limits of concentration as otherwise undesired effects of plasticizing may occur. Also only highly reactive types of polyesters can be processed with such additives. Therefore, many attempts have been made to overcome these disadvantages by chemically building halogen-containing components, for instance tetrachloro-, dibromo- or tetrabromophthalic acid or hexachloroendomethylene-tetrahydrophthalic acid, or the anhydrides thereof, respectively into the polyester. With these acids a great number of flame resistant or self-extinguisting polyester resins is manufactured. (French Pat. Specification No. 1,294,986, Industrial and Engineering Chemistry 46, 1628 (1954), REference 4, Society of Plastics Engineers - Transactions 3, (2) 111, (1963)). The flame resistance may be tested, e.g., by using the method of Hammerl (17th Ann.Technd. Management Conf., Chicago, February 1962, Reinforced Plastics Div., Sect. 12-H, HLT-15 p.1-6). By this method, a flame-resistant self-extinguishing polyester has the value 100, whereas readily or moderately inflammable types have values from 0 to 40. In order to produce shaped bodies with a self-extinguishing index of 100 according to Hammerl, the concentration of halogen in, e.g., styrene-containing polyester compositions must be adjusted to at least 20–24 % by weight of chlorine where chlorine compounds are used and to at least 10–14 % by weight of bromine when using bromine compounds. For this purpose considerable amounts of halogen compounds must be bound in the polyester molecule — a polyester resin with a content of 24 % by weight of chlorine in the form of hexachloro-endomethylene-tetrahydrophthalic acid comprises nearly 44 % by weight of this compound — that the range in variation of the amounts of the various components is very limited. Besides, a number of properties is unfavourably influenced by such high concentrations of halogen. It is known that the halogen content may be considerably reduced by the addition of antimony trioxide without disadvantageously affecting flame resistance. The addition of antimony trioxide, however, is impossible if transparent materials, coatings or glass-fibre-reinforced shaped bodies are to be manufactured. The amount of halogen required may also be markedly reduced by chemical combination with phosphorus compounds, e.g., according to the process of German Auslegeschriften Nos. 1,122,252 and 1,142,440. The phosphorus compounds, however, so far proposed for this purpose, react with acid or hydroxy groups with splitting off of alcohols, water or hydrogen chloride, which, e.g., may be disadvantageous if the additives are mixed with unsaturated polyesters which still contain free functional groups, and these mixtures, if desired are polymerized together with unsaturated monomers under heating and moulding.

THE INVENTION

The invention is concerned with halogen-containing cyclic groups but are nevertheless not only very readily compatible and miscible with polyesters, especially unsaturated polyesters, but may also be bound chemically into or to polyester molecules without the formation of volatile by-products, which is sometimes inconvenient. They also are well adapted for a combined application together with other halogen compounds. Polyesters and moulding compositions comprising unsaturated polyesters and monomers copolymerisable therewith, which contain the cyclic phosphonic esters used according to the invention and, if desired, further halogen compounds admixed or chemically bound thereto may easily be processed. The polyesters are fire-retardant, and the hardened products prepared from the polyester-compositions have a high self-extinguishing index while the mechanical or other properties are not impaired.

The invention is not limited to a specific nature of polyesters, which constitute a well known and well established class. The present invention is applicable to all polyesters, preferably unsaturated polyesters. The fire retardant properties are imparted to the polyester-containing compositions irrespective of the exact nature of the polyester. The polyesters referred to also include oligomeric esters, i.e., polyesters having a molecular weight of at least about 400.

Accordingly, the invention is concerned mainly with processes for improving the flame resistance of polyesters and shaped articles manufactured therefrom, especially from unsaturated polyesters, and compositions comprising unsaturated polyesters, olefinically unsaturated monomers copolymerizable therewith and, if desired, fillers and other conventional additives by chemical binding and/or admixing organic phosphorus compounds and, if desired, halogen compounds into the polyesters and/or into compositions for preparing shaped bodies. According to the invention halogen containing at least bicyclic phosphonic esters are used which are free from hydroxy and carboxylic groups and to which, because of their method of preparation, the following general formula (I) may be given.

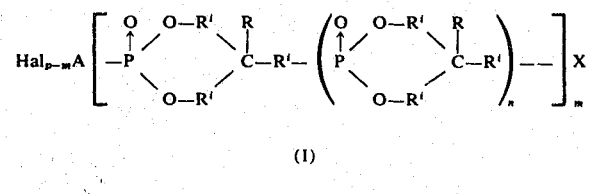

(I)

In this formula m and p are integers and at least 1; p is preferably at most 4; n =0 or an integer from 1 to 80; m is not greater than and is preferably equal to p and, when n = 0, preferably greater than 1. m is greater than 1 only when n is zero and m equals p. The product n · v m shall generally be below about 60, preferably below about 40. A stands for a monovalent or polyvalent hydrocarbon radical, the free positions of which are at the same or at different carbon atoms and in which the sequence of the carbon atoms may be interrupted also by hetero atoms, preferably, e.g., each of one to three pairs of carbon atoms may be interrupted by an oxa- or aza-atom. The radical A may furthermore be substituted by halogen atoms, which are not or are only with difficulty susceptible to a Michaelis-Arbusow-reaction, as defined in H. Krauch and W. Kunz, " Namensreaktionen der organischen Chemie", Heidelberg, Germany, 1961, page 18, e.g., halogen atoms in an aromatic nucleus. The Michaelis-Arbusow reaction is also described in The Merck Index, eighth edition, page 1193, 1968, as: "Formation of monoalkylphosphonic esters by heating alkyl halides with trialkyl phosphites, via the intermediate unstable phosphonium salt:

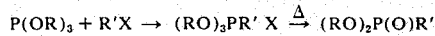

$$P(OR)_3 + R'X \rightarrow (RO)_3PR' \; X \xrightarrow{\Delta} (RO)_2P(O)R'$$

with the citation of the following authority: A. Michaelis and R. Kaehne, Ber. 31, 1048 (1898); A. E. Arbusow, J. Russ, Phys. Chem. Soc. 38, 687 (1906); Chem. Zentr. 1906, II, 1639.

A is a hydrocarbon radical with, preferably, from 2 to 24 carbon atoms, but it may also have only 1 carbon or more than 24 carbon atoms. The hydrocarbon radical can have, e.g., from 1 to 19 carbon atoms and is either saturated, e.g. n-octodecyl; monoolefinically unsaturated, e.g., the radical of n-decene, n-hexadecene or butene; or polyolefinically unsaturated, e.g., the radical of hexadiene; it is either acyclic aliphatic as in the preceding illustrations or cyclic aliphatic, e.g., cycloalkylene having from 5 to 7 ring carbons. The aliphatic radicals may have conjugated double bonds but the double bonds are preferably isolated; they may be interrupted by from 1 to 3 nonconsecutive nitrogen atoms, e.g., the $\beta,\beta'$-radical of either diethyl- or triethylamine, or from 1 to 3 nonconsecutive oxygen atoms, e.g., the $\alpha,\omega$-radical of diethylene glycol diethylether. A is alternatively, aromatic, preferably with one or two rings, e.g., phenylene, naphthylene and diphenylene; aliphatic aromatic, the aliphatic being hydrocarbon aliphatic as above-exemplified, e.g., the radicals tolylene, benzylene, and styrylene; hydroaromatic, e.g., tetrahydronaphthylene; or heterocyclic having at most three hetero atoms and one ring or two condensed rings, each ring having from 5 to 7 ring members, any ring hetero atom being either an oxygen or a nitrogen atom bound to two ring carbon atoms, e.g., the bi- or trivalent radicals or triazine, benzoxazole, quinoxaline. Other examples of A are, in particular; 1-n-octyl, ethylene, trimethylene, 3-chloro- or 3-bromo-trimethylene, the tetramethylene or decamethylene radicals. Further examples are the ethyl, 1-propyl, 1-n-tetradecyl radicals, the 1,2-radical of isooctane (2,4,4-trimethylpentane), the 1,2-cyclohexylene, 1,4-bis-(methylene)-cyclohexane, benzyl, p-xylylene, tris-(methylene)-benzene, tetra(methylene)-methane; 1,1,1-trimethylene-propane radicals, the $\beta,\beta'$-radical of diethyl ether and the 2,4,6-radical of (1,3,5)-triazine.

R means a hydrocarbon radical which may contain ether groups or ester groups or both, e.g., 1 to 3 of such groups and — especially if it is aromatic — may also contain halogen instead of or in addition to the ether and ester groups. R may be, e.g., an aliphatic hydrocarbon radical with, for instance, 1 to 18 carbon atoms, preferably an alkyl radical with 1 to 10 carbon atoms, a cycloalkyl-, aryl-, or aralkyl-radical with at most two nuclei, preferably a sole nucleus, wherein the nucleus may be substituted by preferably 1 to 3 radicals, viz. halogen atoms, e.g., chloro and bromo, alkyl groups or alkoxy radicals with preferably not more than 4 carbon atoms. As examples there may be mentioned: ethyl, propyl, allyl, methyl, ethoxymethyl, allyl-oxymethyl, methallyloxymethyl, isooctyloxymethyl, stearyloxymethyl, oleyloxymethyl, palmityloxymethyl, 9,10-dibromooctadecanoyl-oxymethyl, 1,2-dibromo-propyloxymethyl, a methyl radical substituted by an ester group, e.g., acetoxymethyl, ethyl, propyl, iso-propyl, iso-heptyl, cyclohexyl, methylcyclohexyl, phenyl, methylphenyl, xylyl, cumyl, methoxyphenyl, benzyl, methyl-benzyl, p-chlorophenyl or p-chlorbenzyl or the corresponding bromo compounds. $R^i$ means one of the groups $R^1$, $R^2$ or $R^3$, which mean alkylene groups with from 1 to 6 carbon atoms, preferably methylene groups, or such groups substituted by groups having 1 to 3 carbon atoms, such as alkyl, e.g., methyl and ethyl, alkenyl, allyl, cycloalkyl, cycloalkenyl, e.g., a radical of cyclohexane, carboxylic aryl having 1 ring or two condensed rings, e.g., phenyl and naphthyl, haloaryl radicals, the aryl of which is either phenyl or naphthyl and the halogen of which comprises from 1 to 4 substituents each of which is either chloro or bromo, e.g. 2,4,6-dibromophenyl, and wherein two substituents of a sole methylene group together preferably contain less than 8 carbon atoms. Also in formula (I) the trivalent radicals

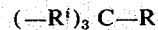

$$(-R^i)_3 C - R$$

may be replaced completely or partly by a radical $R^4$

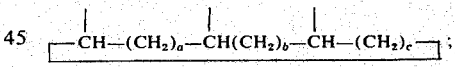

$$-CH-(CH_2)_a-CH(CH_2)_b-CH-(CH_2)_c-\;;$$

in which the sum of the integers a, b, and c is two or three and not more than one of these symbols means zero. In $R^4$ hydrogen atoms may be substituted by the radicals cited above for the methylene groups in $R^1$, $R^2$, and $R^3$ wherein a single substituent of $R^4$ has at most 30, preferably less than 20, carbon atoms and wherein, for two substituents at the same methylene group, preferably the above limitation to 8 carbon atoms shall apply. Especially suited are radicals $R^4$ which are unsubstituted or which have only one substituent and in which $a=b=c=1$. The substituents mentioned for $R^1$ to $R^4$ may be, for example, alkyl groups with up to 4 carbon atoms, preferably methyl groups.

Within a single molecule of the compounds (I) R and $R^i$ signify equal or different radicals according to the definition given for each of them above.

X represents a halogen atom with a atomic weight of at least 35, preferably chlorine and/or bromine.

Hal signifies a halogen atom of the same definition as for X, which is capable of undergoing a Michaelis-Arbusow-Reaction. The invention further relates to the products obtained by said processes, i.e., to polyesters and compositions comprising polyesters for the manufacture of flame resistant hardened products, which contain the cyclic phosphonic esters (I) admixed therewith or chemically bound thereto, as well as to the flame-resistant shaped bodies and articles manufactured by using such materials. Finally the invention comprises hitherto unknown halogen-containing cyclic phosphonic esters which are useful for flame retardant polyesters and have other valuable properties, as will be described further below.

The compounds (I) are prepared by reacting bicyclic phosphorous esters, which, e.g., are derived from 1,1,1-trimethylol-compounds and have the formula

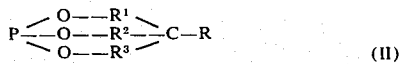

(II)

with organic halogen compounds $AHal_p$, wherein R, $R^1$, $R^2$, $R^3$, A, Hal and p have the meanings given above and wherein especially $R^1$ and $R^2$ represent methylene and $R^3$, methylene or alkylidene, e.g., an alkylidene group with up to 5 carbon atoms, preferably ethylidene, or wherein $R^4$, which has the meaning already indicated, may replace the grouping

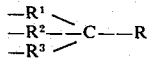

in a Michaelis-Arbusow type reaction at elevated temperatures, generally between 100° and 300°C, preferably from 130° to 250°C. If the above compound contains a group $R^4$ it is derived from a phosphorous ester of the formula

(IIa)

The starting compounds (II) may be prepared in conventional manner, e.g. by transesterification of phosphorous esters with carbocyclic cycloaliphatic trihydric alcohols having from 5 to 7 ring carbon atoms, e.g., phloroglucinol or with trimethylol compounds, such as 1,1,1-trimethylolpropane, 1,1,1-trimethylolethane, 3,3-diemthylolbutanol, 3,3-dimethylolpentanol-2, 1,1,1-trimethylolbutane, pentaerythritolmonoacetate, pentaerythritolmonoallylether, phenyltrimethylolmethane, cyclohexyltrimethylolmethane.

The further reaction of (II) with the halogen containing cyclic phosphonic esters (I) may be performed in the presence or absence of inert solvents, e.g., dibutyl ether, xylene, chlorobenzene. Conventional catalysts which accelerate the Michaelis-Arbusow-reaction, may also be used, e.g., Lewis-acids such as $AlCl_3$, $SnCl_4$, $BF_3$, or addition compounds thereof, copper salts or iodo compounds. The reaction may also be effected under elevated pressure, e.g., up to 10 atmospheres, especially when low boiling alkyl halides are reacted. Operating under reduced pressure is, in principle, also possible, but has in most cases no special advantages.

The organic halogen compounds $AHal_p$ may be saturated or olefinically unsaturated acyclic or cyclic aliphatic compounds with one or more double bonds, which should not be conjugated. Further suitable compounds contain one or two aromatic or hydromatic nuclei and also reactive halogen atoms at saturated aliphatic carbon atoms. The halogen is primarily bromine and/or chlorine but may, if desired, also be iodine. Compounds $AHal_p$ preferably contain at least 54 and at most 85 percent by weight of halogen.

Suitable halogen compounds are, e.g, 1,2-dibromoethane, 1,2-dibromopropane, 1-bromo-3-chloropropane, tetrabromoethane, 1,2-dibromo-3-chloropropane, 1,2-dibromo-3-chloro-2-methylpropane, 1,4-dichlorobutane, 1,4-dibromobutane, 1,2-dibromoisooctane (1,2-dibromo-2,2,4-trimethylpentane), 1,10-dibromodecane, 1,2-dibromocyclohexane, 1,4-bis-(chloromethyl)cyclohexane, 1,14-dibromo-tetradecane, dibromotetradecane, 1,19-dibromo-9-chlorononadecane, 1,17-dibromo-9 -chloro-heptadecane, p-xylylenedichloride or -dibromide, tris-(bromomethyl)benzene, $\beta,\beta'$-dichlorodiethylether, 9,10-dichloromethylanthracene, 1,5-bis-(chloromethyl)naphthalene, 1,5-bis-(chloromethyl)-8-methoxynaphthalene, dihalogenides of oligomer glycols, e.g., the chlorides of di-, tri- or tetramethylene glycol (= 1,11-dichloro-3,6,9-trioxaundecane), tris(chloroethyl)amine, bis-(chloroethyl)methylamine, 2,3-dichloroquinoxaline, 2,4,6-tris-chloro-1,3,5-triazine, 2,3-dichloro-6-methoxyquinoxaline and benzoxazol.

For the introduction of more than two phosphonic ester groups, 1,1,1-tris-(chloromethyl)propane, tetra-(chloromethyl)methane, tris-(chloromethyl)benzene and similar compounds, in which a threefold or manifold occurring MichaelisArbusow-reaction is possible, are especially suitable i.e. with due regard to steric considerations.

According to the process, cyclic phosphonic esters with more than one phosphorus atom in the molecule can be prepared. If, e.g., 1,2-dibromethane is reacted with the bicyclic phosphorus ester of trimethylolpropane as compound (II), the reaction proceeds as follows and proceeds also to virtual completion

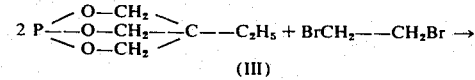

(III)

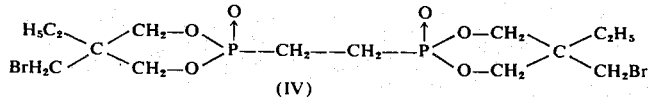

(IV)

Thus the 1,2-bis-(5'-ethyl-5'-bromomethyl-1',3'-dioxa-2'-oxydophosphorinanyl-2')-ethane is obtained.

Suitable solvents for the reaction are, e.g., saturated aliphatic or cycloaliphatic or preferably aromatic hydrocarbons, especially xylene, toluene, tetrahydro- or decahydronaphthalene, isooctane, heptane, chlorobenzenes, cyclohexane or mixtures thereof. Also an excess of the polyhalogen compound may serve as solvent.

If the components are used in an amount of 1 mol of bicyclic phosphorous ester for each gram-atom of halogen to be reacted, nearly completely monomeric halogen-containing cyclic phosphoric esters are obtained, i.e., $n=0$ in formula (I). In most cases they are highly viscous, colorless or yellowish liquids or soft resins, which frequently become crystallized and the melting points of which are so high that they generally cannot be distilled without decomposition even in vacuo. This is however unnecessary, as the reaction products are formed in good purity. Compounds which contain more than two cyclic phosphonic radicals are mostly glasslike. In spite of their high molecular weights they are moderately to well soluble, e.g., in aliphatic ketones, alcohols, glycols and glycol ethers, e.g., butanone, amylalcohol, ethylene glycol, ethylene glycol monobutyl ether, propylene glycol dimethyl ether. They may be precipitated by water in the form of emulsions from glycolic solvents. The emulsion can be stabilized without difficulty by means of suitable emulsifying agents. From the compounds, prepared as disclosed, those which correspond to the general formula (I), with $n=0$, $p=m$, $m=2,3$ or 4, preferably $m=2$, are not only suitable for polyesters but are also applicable with good results for rendering wood, paper, fabrics, phenolic resins, epoxy resins and polymerisation products, e.g., polystyrene, polyvinyl chloride, polybutadiene, polyacrylonitrile, flame resistant. They also may be used as pesticides, intermediates for the manufacture of high molecular phosphorus-containing polymers, such as the above-mentioned polymers, or as additives for lubricants and motor fuels. This special group of compounds is obtained when, under the conditions described above, di-, tri- or tetrahalogen compounds of the general type AHal$_p$ ($p = 2, 3$ or 4, preferably 2; meaning of A and Hal as above), especially the halogen compounds cited above, are reacted with a bicyclic phosphorus ester in an amount stoichiometric to the halogen atoms in the starting compositions.

If, in the reactions of organic halogen compounds with bicyclic phosphorus esters, more than one mol of these esters is used for each gram-atom of halogen capable of undergoing a Michaelis-Arbusow-reaction in the starting compounds, more or less high-molecular, oligomeric or polymeric reaction products are obtained, dependent on molar proportions and reaction conditions, as the halogen atoms of the monomeric cyclic phosphonic esters primarily formed, e.g., the two bromine atoms in compound IV, are susceptible to further reaction with excess bicyclic phosphorus ester. Therefore, in the products finally obtained, $n$ (formula (I)) is greater than 0. In most cases the products are mixtures of compounds of various degrees $n$ of polymerisation, which may be used per se according to the invention.

For the preparation of the oligomeric and polymeric cyclic phosphonic esters halogen compounds of the general formula AHal$_p$ with the meanings cited above are also used. Besides the substances already mentioned, 1-bromooctane is especially applicable; furthermore n-propyl chloride, 1-bromotetradecane, 1,4-bis-(bromomethyl)cyclohexane, benzyl bromide and cyanuric acid chloride are suitable.

For the introduction of more than 2 phosphonic acid chains 1,1,1-tri(bromomethyl)propane, tetra(bromomethyl)methane or the halogen compounds already cited in which a Michaelis-Arbusow-reaction is possible at least three times are also especially suitable. The reaction may be performed in various ways. Thus, the bicyclic phosphorus esters may be reacted directly with organic halogen compounds which contain at least one halogen atom with an atomic weight of at least 35, which is susceptible to a Michaelis-Arbusow-reaction. Then the bicyclic phosphorus esters are applied in a molar excess over the reactive halogen atoms in the starting compounds; the greater the molar excess, the higher is the molecular weight of the polymer. The excess of bicyclic phosphorus esters preferably amounts to at least 0.5 mol over the quantity necessary for the reaction with the active halogen atoms in the starting compositions, so that a predominant molar portion of a compound having a chain of at least two repeating cyclic phosphonic units is expected in the reaction mixture. The formation of chains, however, may begin before all of the halogen atoms of the starting halogen compounds, which are susceptible to a Michaelis-Arbusow-reaction, have reacted with the bicyclic phosphorus esters. Theoretically, there is no upper limit for the excess but, in the cases of greater practical importance generally, not more than 60, preferably not more than 40, mols should be used. Generally, the reaction proceeds according to the equation:

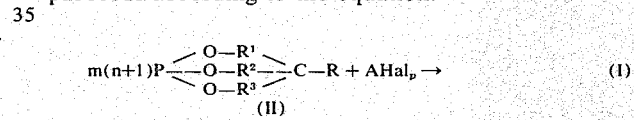

But it is also possible to prepare monomeric cyclic halomethylphosphonic esters (V) first from about stoichiometric amounts of bicyclic phosphorus esters and organic halogen compounds and to react said esters (V) with further amounts of bicyclic phosphorus esters according to equation 3):

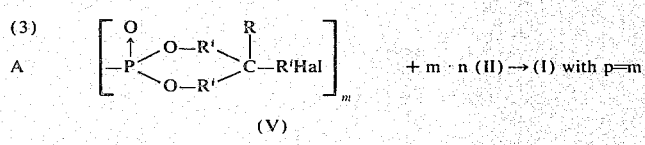

Herein again A, R, R$^1$ . . . R$^3$, R$^i$, $m$ and $n$ have the meanings indicated above.

For the preparation of oligomeric or polymeric cyclic phosphonic esters the reactions are also performed at the temperatures cited. They may occur in the presence or absence of solvents. Hydroaromatic hydrocarbons or halogenated aromatics, e.g., methylcyclohexane, α-chloronaphthalene, are suitable as solvents also in this case. Under elevated pressure, also low boiling solvents, such as tetrahydrofurane, benzene, xylene, aliphatic hydrocarbons, trimethylpentane, dioxane, etc., may be used. At high reaction temperatures the reaction is suitably carried out under an atmosphere of inert gas. The reactants may be either completely admixed at the beginning or added gradually during the course of the polyaddition process. In some cases catalysts, e.g., potassium iodide, pyridinium methiodide, cupric acetate, cupric naphthenate, complexes of cupric phosphonate or the other compounds already mentioned, which accelerate the Michaelis-Arbusow-reaction, are advantageously added. It may be appropriate to stop the polyaddition before the monomeric components, especially an excess of bicyclic phosphorus ester, have been completely reacted, and to eliminate the remaining portion by suitable means, e.g., distillation under reduced pressure. Thus it is possible to avoid too high an increase in viscosity during the reaction. The growth of the compounds may be adjusted as desired, and the direction (1 to 4 sterically different directions) of growth may be controlled. By variation of the molar proportions of bicyclic phosphorus esters to halogen compounds, for example, polymers with a few or with many phosphorus atoms may be produced. These products are then distinguished from each other by their respective melting points or softening points, their solubility in highly polar organic solvents, e.g., dimethylformamide, glycols, glycol ethers, and by their mechanical properties. Dependent on the structure and the molecular weight, the substances are clear, highly viscous liquids to glassy solids and often colorless. All of them have a high resistance to elevated temperatures, are flame resistant or flammable only with difficulty. Some products may be heated in the air up to 300°C. without decomposition or discoloration. Surprisingly, as they contain neither free hydroxy nor free carboxylic groups, they may be chemically bound into polyesters, and they are surprisingly excellently compatible in compositions (based on unsaturated polyesters and monomers copolymerizable therewith) for the production of shaped bodies.

Cyclic phosphonic esters, such as those disclosed in the following examples and those structurally represented as compounds VIII to XVI on the formula sheets (pages 36 to 38) are illustrative. Compound VIII may be obtained by reaction of p-xylylene dichloride with the bicyclic phosphorous ester of 3,3-dimethylolpentanol-2. The starting materials of compound IX are the bicyclic phosphorous ester of trimethylolpropane and 2,4,6-tris-chloro-1,3,5-triazine; those of compound X are the bicyclic phosphorous ester of trimethylolethane and 1,5-bis-(chloromethyl)-8-methoxy-naphthalene. The starting materials of compound XI are the phosphorous ester of trimethylolpropane and di(chloroethyl)ester; of compound XII, the trimethylolethane ester and 1,17-dibromo-9-chloro-heptadecane; of compound XIII, the phosphorous ester of pentacrythritol-monoallylether and dibromoethane; of compound XIV the cyclic phosphorous ester of 3,3-dimethylol-butanediol-2,4-monostearate-4 and 1-bromo-3-chloropropane; of compound XV, the ester of trimethylolpropane and tris-(bromomethyl)-benzene; of compound XVI, the phosphorous ester of 1,3,5-cis, cis, cis-tris-hydroxy-cyclohexane and dibromoethane. Further suitable compounds may be also obtained by reaction of this phosphorous ester of the cyclohexane-derivative with one or more of the halogen compounds mentioned above.

Compounds X, XI, XIII, XVII and XVIII to XX have been obtained by polymerization.

Compounds XVII and XVIII to XX reflect different manners in accord with which polymerization progresses. Compound XVII is obtained by reaction of 1 mol of 1,4-dibromobutane with 10 mols of the bicyclic phosphorous ester of trimethylolpropane. As seen from the formula, products are prepared with the phosphonic ester groups a) only on one side, b) on both sides of the alkylene radical in the form of polymerized radicals and c) on one side in the form of a monomeric and on the other side in the form of a polymerized radical. This is reflected by the index symbol $k$ which means an integer from zero to 9. In formula XVII the total of both indices is always 10.

Compounds XVIII to XX are obtained by reaction of 1 mol of 1-chloro-2,3-dibromopropane and 81 mols of the bicyclic phosphorous ester of trimethylolpropane. As is evident from the three formulae, the reaction takes place at any one of the halogen atoms of the 1-chloro-2,3-dibromopropane, wherein $s$ is an integer from zero to 80 and $r$ is the balance from $s$ to at most 80, i.e., $(r+s)$ is always equal to 81. Other polyhalogen compounds with two or more free halogen atoms react principally in the same way. In his manner branched compounds may be obtained. Furthermore, the formulae XVIII to XX show that the monomeric or polymerized radicals with the phosphonic ester groups may be varied in the same manner as in compound XVII. Compounds XVIII and XX may also be obtained according to the method of example 24. For improving the flame resistance of polyesters according to the process of the invention compounds (I) may be directly added to the reaction mixtures when polyester-forming components are reacted. They are thus bound into the resulting polyesters. Polyester-forming components are compounds with more than one, preferably two or even three of more hydroxy- and/or carboxylic functions in the molecule as well as anhydrides thereof.

Suitable compounds are, inter alia, hydroxycarboxylic acids and lactones, e.g., with 3 to 6 carbon atoms, glycolic acid, butyrolactone, epoxides, especially halogen-, alkyl- or arylsubstituted propylene oxides, wherein the substituents preferably contain less than 6 carbon atoms, epichlorohydrine, 1,2-epoxybutane, phenylpropylene oxide, furthermore esters of polyhydric alcohols or polybasic carboxylic acids, e.g. trimethylol propane trilaurate, trimellitic acid tri-n-butyl ester in which either the alcoholic or the carboxylic acid component is volatile at temperatures up to about 180°C. In most cases, however, the polycondensation of polyhydric alcohols, e.g., pentaerythritol, and/or certain polyhydric phenols, e.g., resorcinol, diphenylolpropane, with polybasic saturated olefinically unsaturated carboxylic acids, andhydrides thereof or esters thereof, e.g., maleinic or fumaric acid, adipic acid or maleinic anhydride, with lower monohydric alcohols, e.g., methanol or mixtures of such compounds is concerned. This especially applies with regard to the production of polyesters, in which at least 25 mol % of all acid and alcoholic components, preferably the acid components are olefinically unsaturated compounds. For the formation of the polyesters preferably dihydric, straight-chained or branched aliphatic or cycloaliphatic alcohols may be used, e.g., ethylene glycol; 1,2-propane-, 1,3 - or 1,4-butane, 1,6-hexane-1,10-decanediol; 2,3-butenediol-1,4; 1,1-bis-(hydroxymethyl)-cyclohexene-(3); 2,2,4-trimethylpentanediol-1,3, glycerol, trimethylolethane, trimethylolpropane, hexanetriol, pentaerythritol, sorbitol, bis-(hydroxycyclohexyl)-alkanes as well as alkylene oxide adducts thereof, certain polyhydric phenols, especially with a plurality of non-condensed nuclei, e.g., bis-(hydroxyphenyl)-alkanes and alkylene oxide adducts thereof (wherein each of the alkanes and alkylene oxides has from 1 to 4 carbon atoms in one aliphatic chain).

Examples of polybasic carboxylic acids are besides others aliphatic or cycloaliphatic, preferably dibasic carboxylic acids and carboxylic acids with 4-20 carbon atoms, such as succinic, adipic, sebacic acid, α-octylnonane or α-nonyloctane dicarboxylic acid, fumaric acid, maleic acid, endomethylenetetrahydrophthalic acid or polybasic, preferably mononuclear aromatic carboxylic acids, such as phthalic acid, terephthalic acid, trimellitic acid.

When preparing the polyesters, the polyhydric alcohols and polybasic carboxylic acids are generally used in equimolecular, or equivalent amounts; however an excess, especially of the alcoholic component, up to 10 or 15 % over the equivalent amount may also be applied. If compounds with more than two hydroxy or carboxylic equivalents per molecule are involved in the reaction, their amount is in most cases less than 10, especially less than 3 mol % of the bifunctional reactants present, so that the resulting polyesters will be linear or only slightly branched. If higher proportions of polyfunctional compounds are used or if no bifunctional compound of the same type is additionally applied, undesired gel formation may be prevented in conventional manner by premature interruption of the reaction. The reaction is performed in conventional manner at temperatures between about 50° and 250°C, preferably at 130° to 180°C. Catalysts for the acceleration of the condensation may be present in the reaction mixtures, e.g., sulfonic acids, e.g. $p$-toluenesulphonic acid, amines, e.g., triethylamine, amines or aryl phosphorous esters, e.g., triphenyl phosphite. The cyclic phosphonic esters (I) are thus bound into the polyester molecule e.g., by ring opening and polyaddition. Generally the esters (I) are added to the reaction mixtures in such amounts, that the phosphorus content of the product therefrom is from about 0.07 to about 3.8 % by weight, if at least 90 % by weight of the reaction mixture are reacted; but in special cases these limits may also be exceeded, for instance considerably up to about 15 % by weight of phosphorus. When further halogen containing compounds are used together with the compounds used according to the invention phosphorus contents of the polyesters in the range of from about 0.6 to 1.7 % by weight are preferred. But even at the lower phosphorus contents cited above, flame resistance is still considerably improved. The halogen content of the polyesters generally is in the range from 6 to 25 % by weight. Halogen compounds, which may additionally be used, are inter alia halogen containing, preferably polybasic acyclic or cyclic aliphatic or aromatic carboxylic acids or anhydrides thereof, the aromatic compounds preferably being mononuclear. For instance, dichlorosuccinic acid anhydride, hexachloroendomethylenetetrahydrophthalic acid, tetrabromophthalic acid, dichlorophthalic acid, dibromobenzoic acid may be cited. Furthermore halogen containing, preferably also polyfunctional, a cyclic aliphatic, cycloaliphatic or araliphatic alcohols which may, e.g., have 2 – 20 carbon atoms and may also be olefinically unsaturated, or halogen containing polyfunctional phenols are suitable, e.g., chloropropanediols, chlorobutanediols, 2,2-bis-(chloromethyl)-propanediol-1,3, α, β-dibromomethyl-3,4-di-hydroxycyclohexane, pentachlorophenyl monoglycolic ether, 4,4'-bis-(β-hydroxyethoxy)-3,3', 5,5'-(tetrachloro- or tetrabromo-) diphenyldimethylmethane, trichloroethanol, also addition compounds from hexachlorocyclopentadiene and dienophilic compounds, e.g., butene-2-diol-1,4; furthermore halogenated waxes, halogen containing esters, halogenated hydrocarbons are suitable, e.g., trichlorodiphenyl, tetrabromodiphenyl, perchloropentacyclo-(5,2,1, $0^{2,6}$, $0^{3,9}$, $0^{5,8}$)-decane, chloroparaffines with 30–70 % by weight chlorine content. As far as polyfunctional compounds are concerned which contain hydroxy- or carboxylic groups and also halogen, they are built into the polyester molecule during the reaction. If desired, conventional phosphorus or phosphorus and halogen containing flame-retardant components, e.g., alkylphosphonic esters or phosphoric esters such as tris(3-chloroethyl)-phosphate, tris-(dichloropropyl)-phosphate, tris-2,3-(dibromopropyl)-phosphate may also be used together with the cyclic phosphonic esters applied according to the invention. Only such substances, e.g., unsaturated polyesters which do not impair subsequent hardening, which do not conflict with the intended final use are selected as additional components.

It is of advantage, that the cyclic phosphonic esters (I) may react during the formation of the polyester as well with hydroxy as with carboxylic groups, i.e., that they are not built as acid glycolic component. This facilitates the tailoring of the best polyester formulations. Unsaturated polyesters which have been produced with addition of (I) and contain thereafter these phosphonic esters in chemically bound form show no corrosive properties. They may be hardened in conventional manner with polymerizable monomers, e.g., in the proportion of weight from 9(polyester): 1 to 1 : 3, preferably more than 1 : 2, by the addition of catalysts to yield hard vitreous shaped bodies, which have a very low colour value. Suitable catalysts for hardening are especially peroxides, e.g., di-tert.-butyl peroxide, benzoyl peroxide, p-menthane-hydroperoxide, cumene hydroperoxide, methylethyl ketone peroxide, furthermore azo compounds such as azodiisobutyronitrile or organic metal compounds, e.g., dibutylstannic oxide, ferrocene, cobaltous naphthenate. For cold setting vanadium containing compounds, e.g., vanadium acetylacetonate, are especially useful accelerators.

The monomers with at least one olefinic double bond, copolymerizable with the unsaturated polyesters, are in most cases vinyl, vinylidene or allyl compounds with boiling temperatures above about 60°C. They may be free from halogen as, e.g., styrene, alkylsubstituted styrenes, such as α-methyl-styrene, vinyltoluenes; 2,3-, 2,4- or 2,5-dimethylstyrene, triallylcyanurate, other allyl esters, or ethers e.g., allyl acetate or -acrylate, diallyl carbonate, allyl lactate, allyl α-hydroxyisobutyrate, diallyl adipate, diallyl ether, glycerol triallyl ether, vinylacetate, vinyl esters of other aliphatic monocarboxylic acids, such as vinyl proplorate, vinyl laurate, vinyl stearate; vinyl ethers, e.g., vinyl methyl ether or vinyl isobutyl ether; vinyl ketones, such as vinyl methyl ketone or vinyl hexyl ketone, methyl isopropenyl ketone, N-vinyl compounds e.g., N-vinyl pyrrolidone, N-vinyl carbazole, N-vinyl succinimide, derivatives of α, β-unsaturated carboxylic acids, e.g., acrylic or methacrylic esters, (meth)acrylamide, N-methylol acrylamide, methyl(meth)acrylate, n-butylacrylate, cyclohexyl acrylate, dodecylacrylate, other acrylic compounds, such as (meth)acrolein, (meth)acrylonitrile. Also, the polymerizable monomers, such as styrenes which are halogenated in the nucleus, e.g., bromostyrenes, diallyl tetrachlorophthalate, pentachlorophenylacrylate, 2-chloroethylacrylate, vinylchloroacetate, vinylidene chloride and di-(2,3-dibromopropyl)-maleate, may serve at least partially as halogen carriers. It has proved to be of advantage to introduce the total halogen in the form of a plurality of compounds, e.g., to condense at least two halogen compounds into the polyesters when preparing them or to introduce one compound in this way and to admix further compounds with the final polyester and/or to copolymerize with the polyester on hardening. The hardened products show good mechanical and electrical properties; thus the invention is also applicable for moulding compositions and in the manufacture of reinforced shaped bodies from unsaturated polyesters. For these purposes the great adherence of the polyesters prepared according to the invention to glass-fibres is of great advantage.

Owing to their good compatibility and their neutrality as well as to their good resistance to hydrolysis, the phosphonic esters (I) may very often also be mixed with polyesters, particularly with unsaturated polyesters which may be used in combination with polymerizable monomers, catalysts, accelerators, if desired fillers, such as glass-fibres, asbestos, minerals, e.g., kaolin, cellulosic materials, furthermore inhibitors, dyestuffs, etc., in conventional manner as hardenable moulding compositions. The invention thus may also be performed by admixing cyclic phosphonic esters (I) to one or more polyesters which have been prepared in conventional manner, especially by also using halogen containing components, at room temperature or elevated temperatures at which the viscosity of the polyester is sufficiently reduced. If unsaturated polyesters are concerned, the copolymerizable monomers and other additives or auxiliaries conventional, e.g., for the preparation of moulding compositions, may be admixed thereto at the same time or prior or later on. In the course of the subsequent hardening, which is performed in conventional manner at room temperature or with supply of external heat, a chemical binding of the phosphonic esters occurs to a certain degree by interaction with free hydroxy and/or carboxylic groups in the molecule of the polyester.

The amounts of cyclic phosphonic esters (I), which are present in the moulding compositions either as constituent of the polyester or by admixing may vary within wide limits. The higher is the proportion of phosphorus, the lower the proportion of the halogen containing components may be chosen bound in the polyester or also admixed. At a content of about 1 % by weight of phosphorus in the form of the phosphonic esters according to the invention the halogen content in the hardenable compositions may be about 30 – 50 % lower than in compositions free from phosphorus, without the products becoming more readily flammable. Taking no account of some special cases, in the hardenable compositions prepared according to the invention either by using unsaturated polyesters which contain chemically bound halogen compounds and cyclic phosphonic esters or by admixing the halogen compounds and the cyclic phosphonic esters, the proportion of phosphorus is at least 0.05 and up to 2.5 % by weight, preferably at least 0.5 % by weight, the proportion of halogen 5 – 20, preferably 8 to 15 % by weight. By the reduction of the halogen content in comparison with the amounts that would be necessary without the phosphonic esters according to the invention, a considerable reduction of the specific gravity is achieved. Also, said reduction has a favourable effect on the mechanical properties of the shaped bodies obtained from the composition.

EXAMPLE 1

(Preparation of a polyester moulding composition)
In a stirrer vessel a polyester formulation consisting of 127 g of maleic anhydride, 128 g of hexachloroendomethylenetetrahydrophthalic acid, 48 g of phthalic anhydride, 155 g of propanediol-1,2, 24 g of 2,2,4-trimethylpentanediol-1,3 and 52 g of 1,4-bis-(5'-ethyl-5'-bromomethyl-1', 3'-dioxa-2'-oxydo-phosphorinanyl-2')-butane is esterified under increasing temperature gradient up to 175°C within 6 hours in a solvent process using recycled toluene for the azeotropic distillation of the water formed. The remaining acid value is 32. The obtained polyester is a solid, very hard and vitreous substance. After stabilization with 0.01 % by weight of hydroquinone the reaction mixture with a temperature of 130°C is added to 170 g of styrene. 650 g of a clear hardenable polyester composition are obtained.

COMPARATIVE EXAMPLE

For comparison a polyester similar to that of example 1 with approximately equal contents of chlorine and bromine but without addition of the phosphorus compound is prepared as follows: 127 g of maleic anhydride, 128 g of hexachloroendomethylene-tetrahydrophthalic acid, 23 g of tetrabromophthalic acid, 48 g of phthalic anhydride, 155 g of propanediol-1,2, and 24 g of 2,2,4-trimethylpentanediol-1,3 are esterified likewise in a solvent process up to 175°C. After 6 hours an acid value of 32 is reached. The polyester is a solid, very hard and vitreous substance. The reaction mixture is admixed as in example 1 with 170 g of styrene. Hereby 600 g of a clear hardenable polyester composition are obtained.

For checking the flame retardant properties test specimen are prepared from the polyester compositions according to example 1 and to the comparative example. Hardening is performed in both cases by the admixture of 1 % by weight of methyl ethyl ketone peroxide and 0.5 % by weight of a commercially available vanadium-accelerator (Producer: Oxydo, Emmerich, Germany; solution of an organic vanadium compound, designation: $Q_2d$).

The following table shows the more important properties of the polyester composition (according to example 1) and the test specimen prepared thereof parallel to the comparative type

|  | Example 1 | Comparative Example |
| --- | --- | --- |
| Colour value (according to German Standard DIN 53 403) | 1 | 2 |
| acid value | 32 | 32 |
| viscosity (determined according to Ubbelohde DIN 51 562) | 2700 cp | 2700 cp |
| content of styrene | 30 % | 30 % |
| content of chlorine | 11.2 % | 11.7 % |
| content of bromine | 2.5 % | 2.5 % |
| content of phosphorus | 0.95 % | — |
| index of flame resistance according to Hammerl | 100 | 20 |

HLT-15 a fire test developed by the Plastics Laboratory of Hooker Chemical Corporation

EXAMPLE 2

A mixture of
- 127 g maleic anhydride
- 128 g hexachloroendomethylenetetrahydrophthalic acid
- 52 g reaction product of 2 mols of the bicyclic phosphorous ester of trimethylolpropane with 1 mol of 1,4-dibromobutane
- 41 g phthalic anhydride
- 155 g propanediol-1,2
- 24 g 2,2,4-trimethylpentanediol-1,3 is polycondensated by use of xylene as a carrier for the distillation of the formed water within 6 hours at 170°C to an acid value of 43. The polyester is a solid, very hard and vitreous substance. After the volatile components have been distilled off in vacuo, the polyester is diluted with 182 g of styrene, which contain 0.4 % by weight of an inhibitor, to yield a clear, practically colourless mixture with a content of about 11 % by weight of chlorine, 2.5 % by weight of bromine and 0.9 % by weight of phosphorus. Test specimen, which are prepared from this composition by means of methyl ethyl ketone peroxide and vanadium accelerator without the addition of fillers have an index of flame resistance (according to Hammerl) of 100. A polyester of the above composition but without the phosphorus compound yields test specimen with an index of 20 after hardening with the same proportion of styrene.

EXAMPLE 3

A mixture of
- 127 g maleic anhydride
- 128 g hexachloroendomethylenetetrahydrophthalic acid
- 55 g phthalic anhydride
- 35.5 g polymer product from 10 mols of bicyclic phosphorous ester of trimethylopropane and 1 mol of 1,4-dibromobutane (average molecular weight 1800)
- 155 g propanediol-1,2
- 24 g 2,2,4-trimethylpentanediol-1,3 is polycondensated under the conditions of example 2. The obtained polyester is a solid, very hard and vitreous substance. The mixture of the polyester obtained with styrene (in the same proportion as in example 2) has a content of 11 % by weight of chlorine, 0.9 % by weight of phosphorus and 0.5 % by weight of bromine. It is hardened by using cyclohexanone peroxide and a vanadium accelerator to form test specimen. These have an index of flame resistance of 80.

EXAMPLE 4

A mixture of
- 127 g maleic anhydride
- 128 g hexachloroendomethylenetetrahydrophthalic acid
- 55 g phthalic anhydride
- 16 g triethylene glycol
- 159 g propanediol-1,2 is polycondensated within 6 hours at 170°C in a solvent process using xylene as carrier. when an acid value of 45 is reached, the readily volatile components are distilled off in vacuo. The obtained polyester is a solid, very hard and vitreous substance. After addition of 0.01 % by weight of tert.-butylhydroquinone the polyester is cooled to 130°C. 63 g of the reaction product of 1 mol of 1,2-dibromoisooctane (2,4,4-trimethyl-dibromopentane-1,2) with 2 mols of the bicyclic phosphorous ester of trimethylolpropane are admixed under stirring together with 190 g of styrene. The clear and nearly colourless mixture with a content of about 10.5 % by weight of chlorine, 1 % by weight of phosphorus and 2.6 % by weight of bromine can be hardened to shaped bodies by using methyl ethyl ketone peroxide and vanadium accelerators. Test specimen prepared thereof have an index of flame resistance of 80 (according to the method of Hammerl). If the phosphorus compound is not added, mixtures with styrene are obtained which yield under equal conditions of hardening test specimen with an index of 20.

Polyesters, prepared according to examples 2–4 in admixture with styrene show no kind of corrosive effects even after an 8–10 months storage in normal cans from tinned sheet-iron.

PHYSICAL TESTS

An unsaturated polyester containing halogen is prepared as follows: 942 g of maleic anhydride, 768 g of hexachloroendomethylene-tetrahydrophthalic acid, 65 g of phthalic anhydride and 1302 g propanediol-1,2 are polycondensated at a temperature of 160° to 170°C with the use of xylene as a carrier for the distillation of the water formed, until the acid value is 50. After the volatile components have been distilled of in vacuo, the colorless polycondensate is cooled to 150°C. 1070 g of styrene and 400 mg of hydroquinone as a stabilizer are then added at a temperature of 130°C. 3680 g of a polyester solution having a viscosity of about 950 (of 20°C) are obtained. Test specimen are prepared from this composition by means of methylethylketone peroxide and a vanadium accelerator without the addition of fillers. They are hard, clear and colorless shaped bodies.

The cyclic phosphonic esters according to the following examples 5 to 14 are added and condensed to the obtained precondensate in the amounts as mentioned in examples 5 to 14 so that in every case about the same phosphorus content of about 1 % by weight of the polyesters is obtained. 2610 g of the polyester as disclosed above are modified with a cylic phosphonic ester as disclosed in examples 5 to 14 prior to its dilution with styrene.

The obtained test samples are analyzed with respect to their halogen and phosphorus contents. Furthermore the viscosity, the Martens value (dimensional Martens-DIN under heat according to Markens-DIN 53 458) and the inflammability resistance according to (method of Hammerl) the Hooker Laboratory Test (HLT 15 Index) was tested. The obtained values are evident from the table below. For the Hooker Laboratory Test 15 there is prepared a plate with a thickness of 2 mm. From this plate test samples of 100 × 12,5 mm are cut, 5 pieces thereof being necessary for one burning test. These 5 samples are vertically hold in a gas flame of a special type and size under the same conditions during 5, 7, 10, 15 or 25 sec. After removal of the flame there is observed how long the samples continue to burn. According to the sequence of the mentioned burning times the afterburning time until the flame extinguishes should not exceed 10, 14, 20, 30 and 50 sec. If this is the case each sample has a value of 20 so that a sample after the 5 burning tests can reach a value of 100 at maximum. Only the successful burning tests in the mentioned sequence are tested. If e.g., the afterburning time of a sample is exceeded at the fourth burning test, only the three preceding burning tests are evaluated and the sample has then a value of 60.

EXAMPLE 5

326 g of the cyclic phosphonic ester according to example 15 are used.

EXAMPLE 6

306 g of the product according to example 16 are used.

EXAMPLE 7

306 g of the product of example 17 are used.

EXAMPLE 8

342 g of the reaction product of 2 mols of the bicyclic phosphorous ester of trimethylolethane and 1 mol of 1,2-dibromo-3-chloropropane are used. This product has been prepared in the analogous process as disclosed in example 17. It is a yellowish, tough fluid.

EXAMPLE 9

383 g of the raw reaction product of 2 mols of the bicyclic phosphorous ester of the following structure

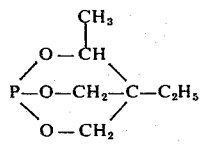

and of 1 mol of 1,2-dibromo-3-chloro-2-methylpropane are used. It has been prepared in the analogous process as described in example 16 and it is a yellowish, tough fluid.

EXAMPLE 10

319 g of the raw reaction product of 2 mols of the bicyclic phosphorous ester of trimethylolethane and of 1 mol of 1,4-dibromobutane are used. It has been prepared in the analogous process as disclosed in example 6 and it is a colourless, tough resin.

EXAMPLE 11

340 g of the product according to example 18 are used.

EXAMPLE 12

372 g of the raw reaction product of 2 mols of the bicyclic phosphorous ester of trimethylolpropane and 1 mol of p-xylylene dibromide which has been prepared in a process analogous to that described in example 16 are used. It is a tough yellow resin.

EXAMPLE 13

354 g of the reaction product of 2 mols of the bicyclic phosphorous ester of trimethylolpropane and 1 mol of β,β-dibromodiethylether which has been prepared in a process analogous to that of example 16 are used. The compound is analogous to compound XI according to the enclosed formula sheet. It is a highly viscous fluid.

EXAMPLE 14

290 g of the reaction product of 2 mols of the bicyclic phosphorous ester of trimethylolpropane and 1 mol of 1,4-dichlorobutane are used. This reaction product has been prepared by reacting the starting material in a three-neck-reaction at a temperature of 180°C during 18 hours. The reaction mixture is thereafter cooled to a temperature of 80°C; 200 ml of acetone are added. Thereafter the product precipitates in the form of white crystals. These crystals are separated by suction and boiled for further 2 hours with 200 ml of additional acetone. The precipitate is recrystallized from isopropanol. The yield is 235 g (69 % of the theoretical value) with a melting point of 172° to 173°C.

| Polyester according to ex. | percentage Cl | Br | P | Viscosity cP (20°C) | Martens value °C | HLT 15-Index |
|---|---|---|---|---|---|---|
| 5 | 10.2 | 2.5 | 1.00 | 1150 | 107 | 100 |
| 6 | 10.9 | 1.3 | 0.92 | 1000 | 111 | 100 |
| 7 | 10.8 | 1.2 | 0.94 | 1050 | 106 | 100 |
| 8 | 10.7 | 2.3 | 0.98 | 1180 | 110 | 100 |
| 9 | 10.6 | 2.5 | 0.97 | 1050 | 103 | 100 |
| 10 | 10.2 | 2.5 | 0.96 | 1000 | 101 | 100 |
| 11 | 10.2 | 2.4 | 0.97 | 910 | 84 | 100 |
| 12 | 10.1 | 2.4 | 0.96 | 1240 | 97 | 100 |
| 13 | 10.1 | 2.5 | 0.98 | 1070 | 94 | 100 |
| 14 | 11.8 | — | 1.13 | 1030 | 92 | 100 |

EXAMPLE 15

(Preparation of monomeric cyclic phosphonic esters (I)) 324 g (2 mols) of the bicyclic phosphorous ester of trimethylolpropane are stirred with 188 g (1 mol) of 1,2-dibromomethane at a temperature of 170° to 190°C for 8 hours. The mixture, being fluid at the beginning, becomes more and more viscous. Already after 6 hours only small amounts of phosphorous ester are still detectable. After expiration of the reaction time, all readily volatile components are distilled off at 180°C and under a pressure of 10 – 20 mm Hg. A residue of 497 g remains (i.e., 97.3 % of the theoretical amount). This residue solidifies when becoming cold to a glassy colourless mass which is very readily soluble in acetone and ethylene glycol and is readily soluble in toluene. After recrystallization in acetone white coarse-grained crystals with a melting point of 210°C are obtained.

EXAMPLE 16

324 g (2 mols) of the bicyclic phosphorous ester from trimethylolpropane are stirred together with 158 g (1 mol) of 1-bromo-3-chloropropane and 50 g of xylene for 15 hours at 170°C. The reaction mixture which becomes highly viscous is delivered from readily volatile components at 170°C in vacuo. 477 g (= 99 % of the theoretical amount) of white crystals with a melting point of 158° to 159°C are obtained.

EXAMPLE 17

162 g (1 mol) of the bicyclic phosphorous ester of trimethylolpropane are stirred with 125 g (0.5 mol) of 1,2-dibromo-3-chloropropane for 10 hours at 180°C. During this time a stream of an inert gas ($N_2$) is conducted through the reaction mixture. Working up is performed as in example 5. 284 g of a highly viscous, colourless reaction product are obtained (= 98.8 % of the theoretical amount).

EXAMPLE 18

75 g (0.25 mol) of 1,10-dibromodecane are heated with 81 g (0.5 mol) of the bicyclic phosphorous ester of trimethylolpropane and 0.1 g of N-methylpyridinium iodide for 15 hours to 180°C. Hereafter the temperature is raised to 200°C and the pressure is held at 10 mm Hg for 1 hour. Neither phosphorous ester nor 1,10- dibromodecane can be distilled off. In the reaction vessel remain 155.6 g of a yellowish, clear, tough product (= 99.6 % of the theoretical amount).

EXAMPLE 19

158 g (1 mol) of 1-bromo-3-chloropropane are heated with 296 g (2 mols) of the bicyclic phosphorous ester of trimethylolethane for 6 hours to 180°C. After non reacted starting products have been distilled off, the weakly yellowish coloured highly viscous reaction product has a weight of 346 g (= 98 % of the theoretical amount).

EXAMPLE 20

(Preparation of polymeric cyclic phosphonic esters (I)) 97 g (0.5 mol) of n-octylbromide are heated with 810 g (5 mols) of the bicyclic phosphorous ester of trimethylolpropane for 16 hours with stirring to 200° – 220°C. After cooling to 190°C all readily volatile components are distilled off under a vacuum of 15 mm Hg. 906 g (= 99.9 % of the theoretical amount) of a weakly yellowish coloured, glassy mass are obtained. The molecular weight is 1850 (ebullioscopically determined).

EXAMPLE 21

162 g (1 mol) of the bicyclic phosphorous ester of trimethylolpropane are heated with 9.4 g (0.05 mol) of 1,2-dibromoethane and 0.1 g of iodine for 10 hours to 200°C. By the same method of working up as in example 20 a wholly colourless, glassy product with an average molecular weight of 3300 is obtained in nearly quantitative yield.

EXAMPLE 22

108 g (0.5 mol) of 1,4-dibromobutane are stirred with 810 g (5 mols) of the bicyclic phosphorous ester of trimethylolpropane and 250 g of trichlorobenzene (mixture of isomers) for 8 hours at 210° – 215°C. Hereafter the solvent is distilled off in vacuo. The residue solidifies to a colourless, glassy mass. The molecular weight is 1650.

EXAMPLE 23

810 (5 mols) of the bicyclic phosphorous ester of trimethylolpropane are heated with 79 g (0.5 mol) of 1-bromo-3-chloropropane and 0.05 g cuprous iodide for 17 hours to 220° – 250°C. After cooling to 170°C 400 g of ethylene glycol monoethyl ether are admixed with stirring. 1220 g of a highly visvous, practically colourless polymer solution are obtained. A sample which has been freed from the ethylene glycol monoethyl ether in a high vacuo has a molecular weight of 1600.

EXAMPLE 24

56 g (0.1 mol) of a compound of the formula are stirred together with 1184 g (8 mols) of the bicyclic phosphorous ester of trimethylolethane and with addition of 0.5 g of iodobenzene for 14 hours at 180° – 210°C. During the reaction a stream of an inert gas is conducted over the reaction mixture. After cooling to room temperature 1228 g of a brittle, hard, colourless mass are obtained. Yield = 99 %. In the obtained product $n$ is 80 as it results from the molar proportion of the starting materials, and $m$ is 1.

EXAMPLE 25

39.4 g (0.25 mol) of 1-bromo-3-chloropropane and 47 g (0.25 mol) of 1,2-dibromopropane are heated together with 324 g (2.0 mols) of the bicyclic phosphorous ester of trimethylolpropane for 10 hours to 160°C. Further 324 g of the phosphorous ester are added at 130°C to the highly viscous reaction mixture. Hereafter it is stirred for 6 hours at 200°C. After cooling a glassy hard mass is obtained.

EXAMPLE 26

81 g (0.5 mol) of the bicyclic phosphorous ester of trimethylolpropane are heated with 26.15 g (0.125 mol) tetra-(chloromethyl)methane for 50 hours to 200°C. After a small amount of the tetrachloro compound has been distilled off at 210°C and 12 mm of Hg pressure a colourless, glassy body is obtained.

EXAMPLE 27

Films with a thickness of 500 μ of the polymers obtained according to examples 20 – 26 are prepared on glass and metal surfaces by casting the solutions in ethylene glycol and following drying. These films are exposed 2 to 5 times and each time for 20 seconds to a 15 cm high non emitting flame of a Bunsen burner without an inflammation of the films being observed. In most cases only a slight turn to yellow can be perceived.

In the products of examples 20 to 26 $n$ is as follows:

| Example | n |
|---------|-----|
| 20 | 4 |
| 21 | 19 |
| 22 | 9 |
| 23 | 9 |
| 24 | 80 |
| 25 | 3 |
| 26 | 3 |

Generally the polymeric products are solid while the monomeric products are as well solid or liquid.

Formula Sheet

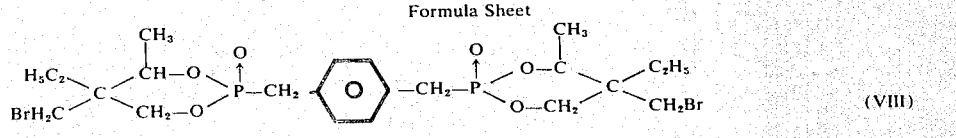

(VIII)

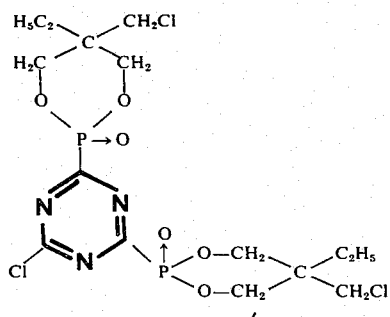
(IX)
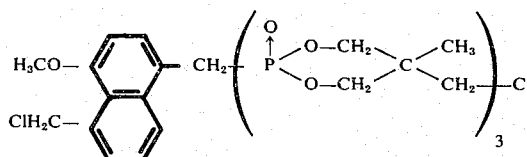
(X)
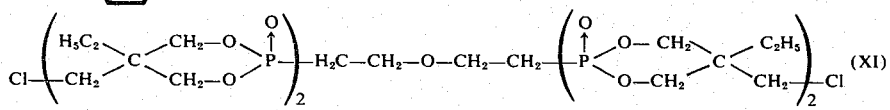
(XI)
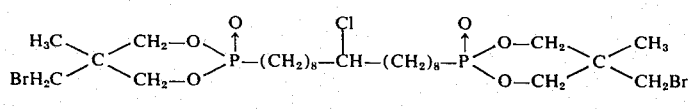
(XII)
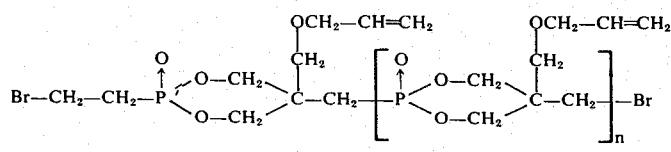
n e.g. = 16 – 70
(XIII)
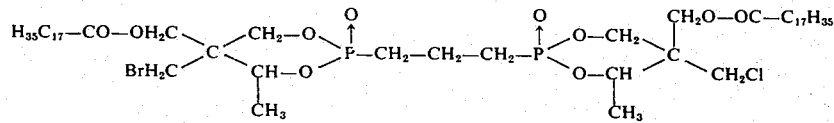
(XIV)
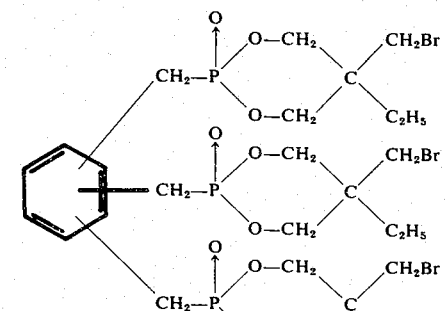
(XV)
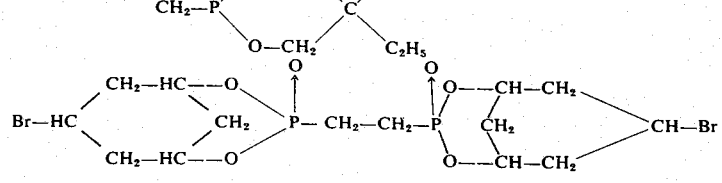
(XVI)
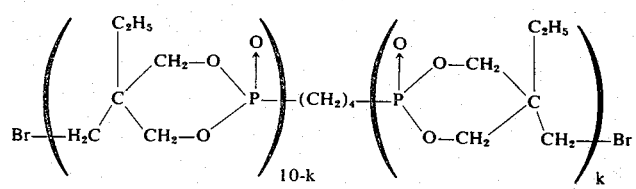
k = 0–9 (XVII)
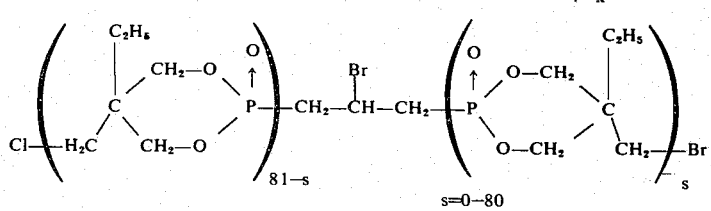
s = 0–80
(XVIII)

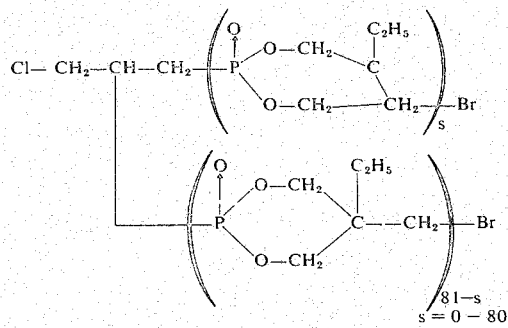

(XIX)

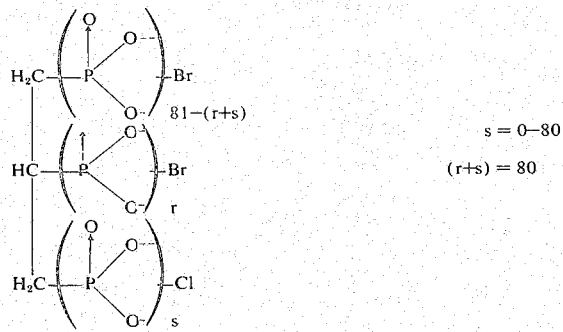

(XX)

What we claim is:
1. An at least bicyclic compound free from hydroxyl and carboxyl groups and of the formula

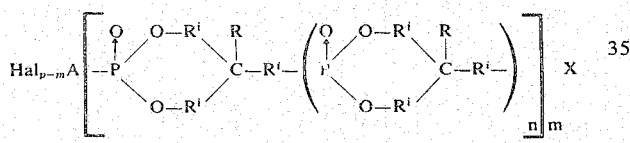

wherein
- $m$ is equal to $p$ and greater than 1 when $n$ is zero;
- each of $m$ and $p$ is an integer from 1 to 4, $m$ being at most equal to $p$;
- $n$ is an integer from and including zero to below about 80, $(m+n)$ being at least 2;
- X is a halogen with an atomic weight of at least 35;
- Hal is a halogen with an atomic weight of at least 35 and which is capable of reaction with trialkyl phosphites in forming monoalkyl phosphonic esters;
- A is a monovalent or polyvalent radical having from 1 to 19 carbon atoms, having free positions at the same or at different carbon atoms and which is: a) a hydrocarbon radical; b) a radical (a) in which each of from one to three pairs adjacent of carbon atoms is, independently, interrupted by an oxa- or an aza-atom; or c) a halogen-substituted radical (a) or (b) in which each halogen is not or is only with difficulty susceptible to a Michaelis-Arbusow reaction;
- R is a member having from 1 to 18 carbon atoms and selected from the group consisting of d) a hydrocarbon radical; e) a hydrocarbon radical substituted by one group —OZ, wherein Z is an acyclic hydrocarbon group having at most one ethylenic bond and at most 4 carbon atoms; f) a hydrocarbon radical substituted by one group —OOC—Y, wherein Y is a saturated or unsaturated acyclic radical with at most 18 carbon atoms; and g) one of components (d) to (f) having an aromatic nucleus and containing halogen;
- each $R^i$ is, independently, a member selected from the group consisting of h) methylene and i) substituted methylene, any substituent thereon being a member selected from the group consisting of aa) a hydrocarbon group and bb) a halogenated hydrocarbon group, one or any two substituents of a sole methylene group (h) containing less than 8 carbon atoms; and
- $(—R^i)_3C—R$ is, alternatively a member selected from the group consisting of $R^4$ of the formula

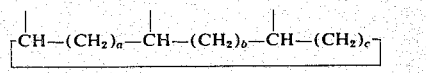

in which the sum of integers $a$, $b$ and $c$ is two or three, at most one of $a$, $b$ and $c$ being zero; and substituted $R^4$, any substituent of substituted $R^4$ having at most 30 carbon atoms, replacing a hydrogen of $R^4$ and being a member selected from the group consisting of (aa), (bb) and cc) an alkoxylated hydrocarbon group, any 2 substituents of a sole methylene group containing less than 8 carbon atoms.

2. A compound according to claim 1 wherein A is a hydrocarbon radical.

3. A compound according to claim 1 wherein A is a modified hydrocarbon radical, the modification being that each of from one to three pairs of adjacent carbon atoms is, independently, interrupted by an oxa- or an aza-atom.

4. A compound according to claim 1 wherein A is a halogensubstituted hydrocarbon radical in which each halogen is not or is only with difficulty susceptible to a Michaelis-Arbusow reaction.

5. A compound according to claim 1 wherein A is a halogensubstituted modified hydrocarbon radical, the modification being that each of from one to three pairs of adjacent carbon atoms is, independently, interrupted by an oxa- or an aza-atom, and each halogen being one which is not or is only with difficulty susceptible to a Michaelis-Arbusow reaction.

6. An at least bicyclic compound according to claim 1 wherein
   A is a member selected from the group consisting of
   1. hydrocarbon radical;
   2. hydrocarbon radical each of from 1 to 3 pairs of adjacent carbon atoms of which is interrupted by an oxygen atom;
   3. aliphatic hydrocarbon radical interrupted by 1 nitrogen atom; and
   4. halogen substitution product of one of components (1) and (2) being interrupted by 1 oxygen atom, in which substitution product each halogen atom is not or is only with difficulty susceptible to the reaction with trialkyl phosphite in forming monoalkyl phosphonic ester.

7. A compound according to claim 6 wherein $Hal_p$ is at least 54 and at most 85 percent by weight, based on the weight of $AHal_p$.

8. A compound according to claim 7 wherein $R^i$ is methylene or substituted methylene.

9. A compound according to claim 7 wherein $(-R^i)_3-C-R$ is $R^4$ or substituted $R^4$.

10. A compound according to claim 6 of the formula

[structure]

wherein Y is
—CH$_2$—CH$_2$—, —CH$_2$—CH$_2$—CH$_2$— or —CH$_2$—CH—CH$_2$—;
                                                    |
                                                    Br and each X is, independently, chloro or bromo.

11. A compound according to claim 10 wherein Y contains three carbon atoms, one X is chloro and the other X is bromo.

12. The compound according to claim 10 of the formula

[structure]

13. The compound according to claim 10 of the formula

[structure]

14. The compound according to claim 10 of the formula

[structure]

15. The compound according to claim 6 of the formula

[structure]

* * * * *

UNITED STATES PATENT OFFICE
CERTIFICATE OF CORRECTION

Patent No. 3,922,323                        Dated November 25, 1975

Inventor(s) JOHANNES REESE, KURT KRAFT and EDGAR DICK

It is certified that error appears in the above-identified patent and that said Letters Patent are hereby corrected as shown below:

Colume 1, line 38, "respectively" should read --respectively,--; line 40, "estinguisting" should read -estinguishing--; line 41, "1,294,986," should read --1,294,986;--; line 42, "REference" should read --Reference--. Column 3, line 6, "$\nu_m$" should read --$m$--; line 61, "particular;" should read --particular:--. Column 4, line 58, "$a=b=c=l$" should read --$a=b=c=1$--. Column 5, in the formula at line 17, "O--R$^1$:" should read --O-R$^1$--, "P--O--R$^2$--C" should read --P-O-R$^2$-C-- and "O--R$^3$" should read --O-R$^3$--; in the formula at line 29, "-R$^2$--C--R" should read -- -R$^2$-C-R--. Column 6, line 39, "benzoxazol" should read --benzoxazole--; line 45, "suitable" should read --suitable,--; in the equation at line 55, "P--O-CH$_2$--C--C$_2$H$_5$ + BrCH$_2$--CH$_2$Br" should read --P-O-CH$_2$-C-C$_2$H$_5$ + BrCH$_2$-CH$_2$Br--; in the formula at line 60, "P--CH$_2$--CH$_2$--P" should read --P-CH$_2$-CH$_2$-P--. Column 8, in the formula at line 37, "P--O-R$^2$--C" should read --P-O-R$^2$-C--; in the reaction scheme at line 50, "A     [" should read --A[--. Column 9, line 51, "pentacrythritol-" should read --pentaerythritol- --. Colume 10, line 49, "andhydrides" should read --anhydrides--. Column 16, line 27, "of in" should read --off in--; line 31, "950(of" should read --950 CP (at--; line 47, "dimensionalsional Martins-" should read --dimensional stability--; line 48, "DIN under" should read --under-- and "Markens" should read --Martens--; line 54, "12,5" should read --12.5--; line 56, "hold" should read --held--. Column 21, in Formula (XIII) at line 30, "$_P\diagdown$O" should read --$_P\diagup$O--; in Formula (XVI) at line 55, "HC--O" (each occurrence) should read --O-CH--. Column 23, line 54, "adjacent of" should read --of adjacent--. Column 26, in the structure at line 38, "HC----O" (each occurrence) should read --HC-O--; in the structure at line 42, "O----CH" (each occurrence) should read --O-CH--.

Signed and Sealed this

Ninth Day of November 1976

[SEAL]

Attest:

RUTH C. MASON
Attesting Officer

C. MARSHALL DANN
Commissioner of Patents and Trademarks